United States Patent [19]

Cawley

[11] 4,438,477
[45] Mar. 20, 1984

[54] COMBINATION POWER AND COMMUNICATION LINE PROTECTION APPARATUS

[75] Inventor: John M. Cawley, East Islip, N.Y.

[73] Assignee: TII Industries, Inc., Copiague, N.Y.

[21] Appl. No.: 410,307

[22] Filed: Aug. 23, 1982

[51] Int. Cl.³ .............................................. H02H 9/06
[52] U.S. Cl. ...................................... 361/119; 361/56; 361/111; 361/55; 179/178
[58] Field of Search ................. 361/119, 118, 120, 56, 361/55, 111, 110, 54; 179/178, 98, 91 R, 184, 186

[56] References Cited

U.S. PATENT DOCUMENTS

| | | | |
|---|---|---|---|
| 4,071,872 | 1/1978 | Phillips, Jr. | 361/56 |
| 4,191,985 | 3/1980 | Phillips, Jr. | 361/119 X |
| 4,237,342 | 12/1980 | Eller et al. | 179/91 R X |
| 4,259,705 | 3/1981 | Stiffer | 361/118 X |
| 4,317,154 | 2/1982 | Passarella | 361/119 |
| 4,343,527 | 8/1982 | Harrington et al. | 179/178 X |
| 4,389,695 | 6/1983 | Carpenter, Jr. | 361/56 X |

Primary Examiner—Patrick R. Salce
Attorney, Agent, or Firm—Martin Sachs

[57] ABSTRACT

A combination power and communication line protection apparatus includes a housing which contains a power line plug adapted to be received by a conventional wall power receptacle and a receptacle suitable for receiving a male line plug from equipment to be protected in addition to a pair of communication line or modular phone jacks into which an outgoing communication line may be received together with a data link communication line in parallel therewith. The apparatus provides an overvoltage protection for a pair of communication lines and an overvoltage surge protector for the power lines and utilizes the power line ground connection to provide the necesssary ground to protect the communication lines from overvoltages thereon.

9 Claims, 5 Drawing Figures

COMBINATION POWER AND COMMUNICATION LINE PROTECTION APPARATUS

BACKGROUND OF THE INVENTION

1. Field of the Invention

The present invention relates to protection devices and, more particularly, relates to a combination power and communication line protection apparatus which provides the needed ground for communication line protection by utilizing the powerline ground as a common ground path in a convenient plug-in assembly.

2. Discussion of the Relevant Art

The art abounds with protection devices utilized on power lines and communication lines. Typical of these protection devices are U.S. Pat. No. 4,128,855 issued to Gilberts on Dec. 5, 1979; U.S. Pat. No. 4,023,071 issued to Fussell on May 10, 1977; and U.S. Pat. No. 3,423,635 issued to Moe on Jan. 21, 1969. The protection devices utilized in the aforementioned patents are designed to specifically protect powerlines or communication lines and are not suitable for the same use that the instant invention has been designed. The instant invention incorporates in a single apparatus a protection device for equipment input power lines, in addition to protection for communication lines carrying data to be received at a distant location.

With the advent of newly designed computers and electronic cash registers, it becomes necessary to provide A.C. power for energizing the computer or cash register device and, it also becomes necessary to provide a communication or telephone line so that the data being fed into the computer or cash register may be transferred to a central computer which may be receiving input information from many remote locations. Therefore, to minimize the installation time and wiring to be done in corporating a new system, it is advantageous to provide a single combination power and communication line protection apparatus which may be readily received into a conventional wall socket. The communication or telephone lines may be plugged into a receptacle provided on the apparatus that is in parallel with a duplicate receptacle capable of receiving the communication or signal lines emanating from the computer/cash register. The input and output receptacles are both protected with surge voltage protectors.

Therefore, it is an object of the present invention to provide a combination power and communication line protection apparatus as a unified assembly readily installable.

It is another object of the present invention to provide a means for establishing a common ground current path for a communication or telephone line to enable overvoltage bypass protection to function properly.

It is yet another object of the present invention to provide a simple inexpensive, readily installable protection device that will simultaneously protect telephone and power lines from overvoltage transients.

It is yet another object of the instant invention to provide a reliable, inexpensive, miniature assembly that may be utilized to contain a powerline receptacle and a communication line receptacle with internal overvoltage protection.

It is still another object of the present invention to provide a combination power and communication line protection apparatus that may be installed by technicians installing computer terminals without requiring the need for disconnecting existing power lines and communication lines to provide overvoltage protection for both the equipment power and communication lines.

The foregoing and other objects and advantages will appear from the description to follow. In the description reference is made to the accompanying drawing which forms a part hereof, and in which is shown, by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
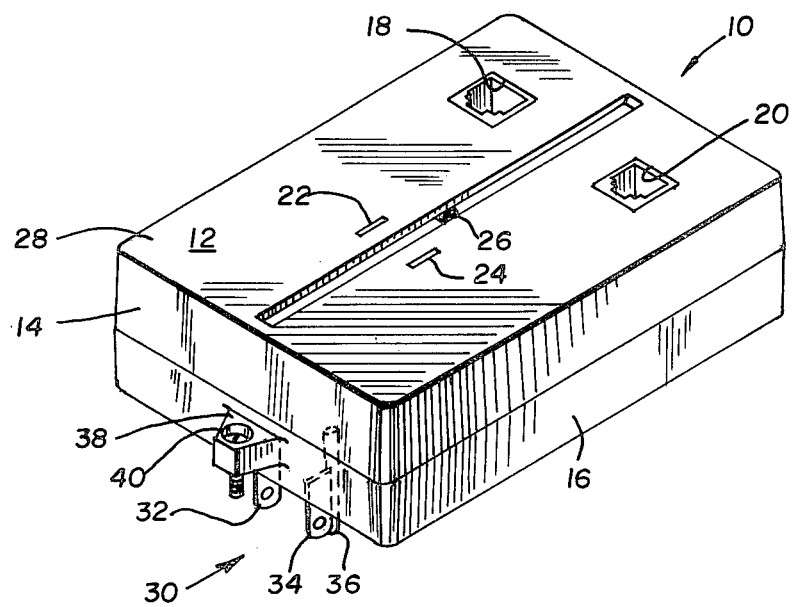
FIG. 1 is a perspective drawing of a combination power and communication line protection apparatus, according to the principles of the present invention.

Referring now to the figures, and in particular to FIG. 1 which is a perspective drawing of a combination power and communication line protection apparatus 10 that includes a housing 12 preferably fabricated in two pieces, an upper or cover portion 14 and a lower or base portion 16, both of which are fabricated from an insulating material such as a thermoplastic, hard rubber, or the like. The cover portion 14 is provided with a plurality of apertures 18, 20, 22, 24, and 26. Apertures 18 and 20 are adapted to receive therein modular telephone plugs, not shown, in general use today on telephone equipment. These plugs generally include four communication lines and their receptacles are connected in parallel in the instant embodiment, the purpose of which will be made clear hereinafter.

Apertures 22, 24, and 26 are arranged to receive a conventional three prong power plug, not shown, with receptacle 26 configured to receive the ground pin of an equipment power plug, not shown. The connections or plugs to be inserted in the power and communication line protection apparatus 10 are made on the top surface 28 of the cover portion 12 which is readily available when the plug 30, that includes pins or terminals 32, 34 and 36, is inserted into a conventional wall receptacle, not shown. Terminal 36 is the ground terminal and is connected in parallel with receptacle 26 and provides a continuous current path with the ground provided in a conventional receptacle. Apertures 22, 24, and 26 are positioned to receive a plug of identical figuration with plug 30 which is normally provided on equipment receiving power from a conventional wall socket. The base portion 16, preferably is provided with an extending or protruding portion 38 which has an aperture 40 disposed herein suitable for receiving a screw, not shown, to affix the base portion to a conventional wall socket plate and housing, not shown.

Figure 2:
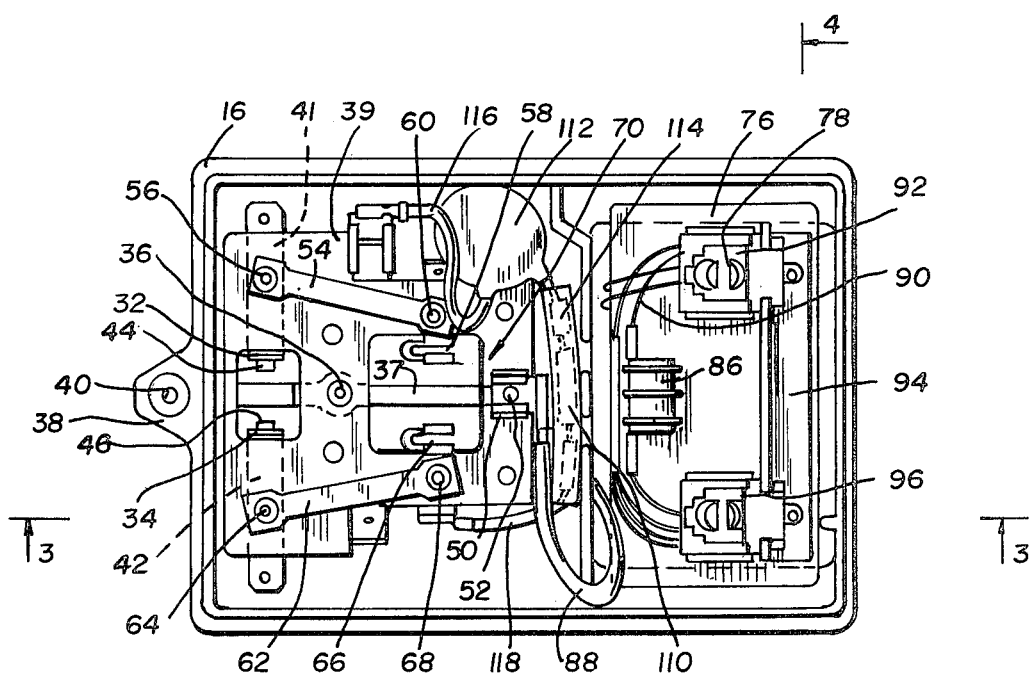
FIG. 2 is a top plan view of the apparatus shown in FIG. 1 with the cover removed.
Figure 3:
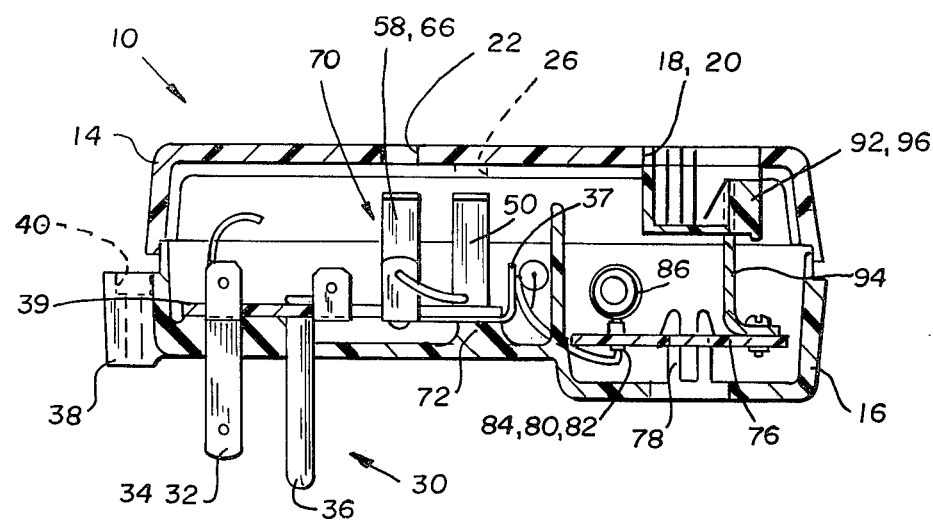
FIG. 3 is a side view in elevation taken along the line 3—3 of FIG. 2.

Referring now to FIG. 2 which shows a top view of the power and communication line apparatus 10 with the cover portion 14 removed, and FIG. 3 which shows a side view in elevation along the line 3—3 of FIG. 2, with the cover portion 14 in position. It can be readily observed that the terminals 32 and 34 of plug 30 extend in an upwardly direction through apertures provided in the base portion 16 of the housing 12 to an insulated terminal board or platform 39 which is provided with a pair of electrically conductive links 41 and 42 to which the terminals 32 and 34, respectively, may be affixed by rivets 44 and 46, respectively, or any other suitable means. Ground terminal 36, in a similar manner, extends upwardly through the base portion 16 of housing 12 and is riveted to an electrically conductive ground link 37 which extends rearwardly towards ground receptacle 50 and is riveted by means of rivet 52 to the terminal board 39, thus providing a common electrically conductive path between ground plug terminal 36 and receptacle 50. An electrically conductive shorting link 54 is riveted to link 41 by means of a rivet 56 and extends rearwardly towards receptacle terminal 58 and is riveted thereto by means of a rivet 60 and extends through terminal board 39 providing an electrically conductive path from receptacle 58, whose lower portion extends beneath the terminal board, and link 54 which is disposed on the upper portion of the terminal board, thereby providing a rigid mechanical assembly as well as a continuous electrical path. In a like manner, electrically conductive link 62 is riveted by a rivet 64 to link 42 and extends rearwardly towards receptacle terminal 66 whose lower portion is disposed beneath the terminal board 39 and is riveted thereto by a rivet 68, thereby providing an electrically conductive path between the link 62 and the receptacle terminal 66, as well as a rigid mechanical structure. Receptacle terminals 58 and 66, together with ground receptacle terminal 50, as disclosed in FIG. 2, provides a receptacle or socket 70 which is adapted to receive a power plug from equipment to be protected, not shown, identical to the power plug 30 provided in the protection apparatus 10 disclosed hereinbefore. Terminal board 39 is affixed to the base portion 16 of the housing 12 by any suitable means, such as by threaded inserts provided in the protruding, upwardly extending lands 72 and 74 provided in the base portion 16.

Figure 4:
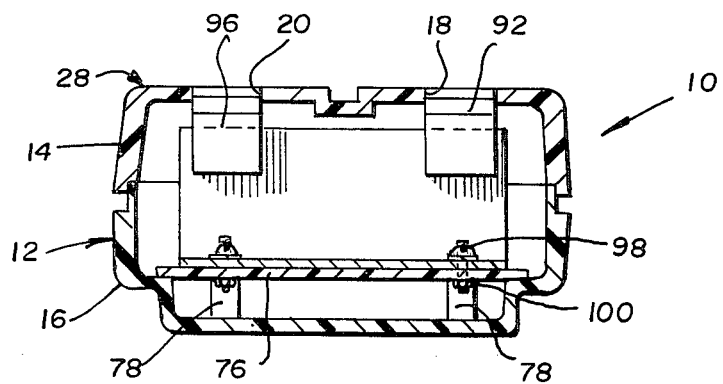
FIG. 4 is a cross-sectional view in elevation taken along the line 4—4 of FIG. 2.

A second platform or terminal board 76 is provided in the rear area of base portion 16 and is affixed to the base portion by means of upwardly extending fingers 78 provided in the base portion 16. The upwardly extending fingers 78 are compressed to fit through apertures provided in terminal board 76 and upon extending therethrough expand retaining the terminal board in position thereon. Terminal board 76 is also provided with three pin receptacle 80, 82 and 84 (See FIG. 3), which are mounted in the terminal board in a conventional manner, and are adapted to receive the pin terminals of a gas tube 86 having two line electrodes and a centrally disposed ground electrode. A gas tube suitable for the instant invention is one manufactured by TII Instruments, Inc., Copiague, New York, as model number TII 47. The gas tube 86 has a ground electrode adapted to be received by the receptacle 82 and two line electrodes adapted to be received by receptacles 80 and 84. Receptacle 82 is connected by a wire or lead 88 to ground receptacle 50, thereby providing a ground path via link 37 and terminal 36, the receptacle ground, not shown, or earth ground which is normally provided in a conventional power outlet, not shown. The line electrode of tube 86 is received by pin receptacle 80 and is connected to one of the communication lines by either a printed circuit arrangement, not shown, provided on board 76, or by a lead wire 90 connected to a modular communication line receptacle 92 disposed in an L-shaped bracket 94, which is affixed to the terminal board 76 in a conventional manner. The opening of receptacle 92 is arranged to be in line or directly beneath aperture 18 provided in the cover portion 14 of the housing 12. In a like manner, modular communication line receptacle 96 is affixed to the bracket 94 in a conventional manner and it is positioned to be in line with aperture 20 in the cover portion 14 of housing 12 when the cover portion is placed in position on the base portion 16. Bracket 94 may be affixed to terminal board 76 by screws and nuts 98 and 100 or any other suitable means, as shown in FIG. 4.

Figure 5:
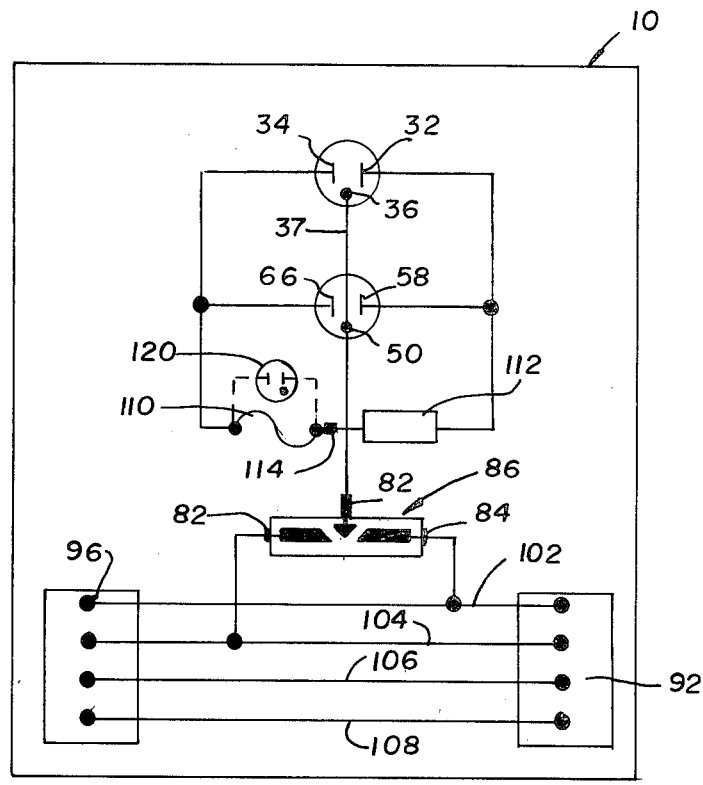
FIG. 5 is a schematic circuit diagram of the components utilized in the combination power and communication line protection apparatus disclosed herein.

The communication lines 102, 104, 106, and 108, as shown in FIG. 5, extend between modular receptacles 92 and 96 and, therefore are connected in parallel. Conductive path or lead wire 102 which is one of the communication lines, is connected to one of the line electrodes of gas tube 86 and communication line 104 is connected to the other line terminal 80 of gas tube 86, thereby providing overvoltage protection for these two lines. An overvoltage appearing on either of these lines would breakover the line to ground gap provided by gas tube 86 and be conducted to ground via the ground electrode which is in contact with pin receptacle 82 as explained earlier.

The power line surge voltage protection is accomplished by the MOV (metal oxide varistor) device 112 which is connected between the phase or hot line to neutral (across receptacle terminals 58 and 66, one of which is typically grounded in the electrical terminal box, not shown).

Additional protection may be provided by utilizing a thermal cut-off device 110 connected in series with the metal oxide varistor 112 by means of a mechanical spline 114 and placed across power line electrodes 58 and 66 by wires 116 and 118, respectively, providing the overvoltage protection for the A.C. power lines. Should the overvoltage transients be present for any extended length of time, the thermal cut-off device 110 which functions similar to a fuse will open.

A suitable thermal device for use in the instant application is one manufactured by Micro-Devices, Inc., Dayton, Ohio known as model number 4178A1 and a suitable metal oxide varistor (MOV) is manufactured by the General Electric Corporation, Syracuse, N.Y., having part number V150LA20B.

The schematic circuit diagram of the combination power and communication line protection device is shown in FIG. 5 wherein a ground current conducting path is provided for the gas tube ground electrode through the ground terminal of the power receptacles.

In operation, an overvoltage appearing on the communication lines protected will breakover gas tube 86 and be conducted to ground as explained earlier. An overvoltage transient appearing on the power line terminals 32, 34, 58, 66 will have the energy therein absorbed by the varistor 112 and the thermal cut-off 110.

The function of the thermal cut-off 110 is to protect the varistor 112 from burning itself out due to excessive current flow therethrough and excessive power dissipation. Experience has shown that when a varistor is damaged it results in a short circuit thereby providing the possibility of arc-over flashes or fire. The thermal cut-off device 110 will prevent this type of failure from occurring. It is also obvious to those knowledgeable in the art that, by providing a neon tube 120 across the terminals of the thermal cut-off device, an indication of the device being in its open condition may be obtained, thus providing a visual indication when the thermal cut-off device is open and in need of replacement.

Hereinbefore has been disclosed a simple, inexpensive, readily installable means for protecting the power lines and a communication lines by the use of a gas tube and an MOV device that share a common current conducting ground path provided in a power receptacle. It will be understood that various changes in the details, materials, arrangement of parts and operating conditions which have been herein described and illustrated in order to explain the nature of the invention, may be made by those skilled in the art within the principles and scope of the invention.

Having thus set forth the nature of the invention, what is claimed is:

1. A combination power and communication line protection apparatus comprising:
   (a) a housing;
   (b) a power plug disposed in said housing, said plug having at least three terminals adapted to be received by a power receptacle having two power line terminals and a ground terminal and be in electrical conductive contact with each of said terminals;
   (c) a power receptacle disposed in said housing and connected in parallel with said power plug, said power receptacle being adapted to receive a mating power plug from equipment to be protected;
   (d) first overvoltage protection means connected from one of said power line terminals to the other of said power line terminals for providing a low resistance current conducting path when the voltage thereacross exceeds a predetermined value;
   (e) a pair of communication line receptacles having at least two electrically conductive paths therebetween disposed in said housing, each of said communication line receptacles being adapted to receive a mating communication line plug therein; and
   (f) a second overvoltage protection means having two line electrodes and a ground electrode, each said line electrode being connected to one of said respective communication lines, said ground electrode being connected to said power plug and power receptacle ground terminals.

2. A combination power and communication line protection apparatus according to claim 1 where said power plug is a male plug having three extending electrically conductive terminals and said power receptacle is a female receptacle similar to that into which said power plug is to be received.

3. A combination power and communication line protection apparatus according to claim 1 wherein said thermal overload means is selected to open said current conducting path at a predetermined temperature caused by the current flowing therethrough.

4. A combination power and communication line protection apparatus according to claim 1 wherein said first overvoltage protection means is a metal oxide varistor.

5. A combination power and communication line protection apparatus according to claim 1 wherein said second overvoltage protection means is a gas tube.

6. A combination power and communication line protection apparatus according to claims 1, 2, 3, 4, or 5 wherein said power plug is disposed on the opposite surface of said housing from said power receptacle and said communication line receptacles.

7. A combination power and communication line protection apparatus according to claim 1 further including visual means for indicating when said thermal overload means has opened said series current conducting path.

8. A combination power and communication line protection apparatus according to claim 7 wherein said visual indicating means is a neon tube.

9. A combination power and communication line protection apparatus according to claim 1 further including thermal overload means connected in series with said first overvoltage protection means from one of said power line terminals to the other of said power line terminals.

* * * * *